United States Patent [19]

Johnson

[11] Patent Number: 4,529,123
[45] Date of Patent: Jul. 16, 1985

[54] RADIANT HEATER SYSTEM

[75] Inventor: Arthur C. W. Johnson, Troy, Mich.

[73] Assignee: Combustion Research Corporation, Pontiac, Mich.

[21] Appl. No.: 529,101

[22] Filed: Sep. 2, 1983

[51] Int. Cl.³ .......................... H01M 4/76; F24C 3/04
[52] U.S. Cl. .................................... 237/1 R; 431/328; 126/92 AC; 165/146; 165/DIG. 2
[58] Field of Search .......................... 126/92 AC, 391; 431/326, 328, 329; 237/67, 1 R; 165/146, 147, DIG. 2

[56] References Cited
U.S. PATENT DOCUMENTS
3,313,288  4/1967  Aho .................................... 126/391

FOREIGN PATENT DOCUMENTS
548499  10/1942  United Kingdom ................. 126/92

Primary Examiner—Henry Bennett
Attorney, Agent, or Firm—Krass & Young

[57] ABSTRACT

A gas or a fired radiant energy heating system wherein a burner is connected to a long radiator tube. Means are provided for balancing the heat output over the length of the tube thereby lowering the temperature at the burner end. In one embodiment, this entails use of a length of insulator in the tube adjacent the burner and a length of turbulator near the exhaust.

10 Claims, 10 Drawing Figures

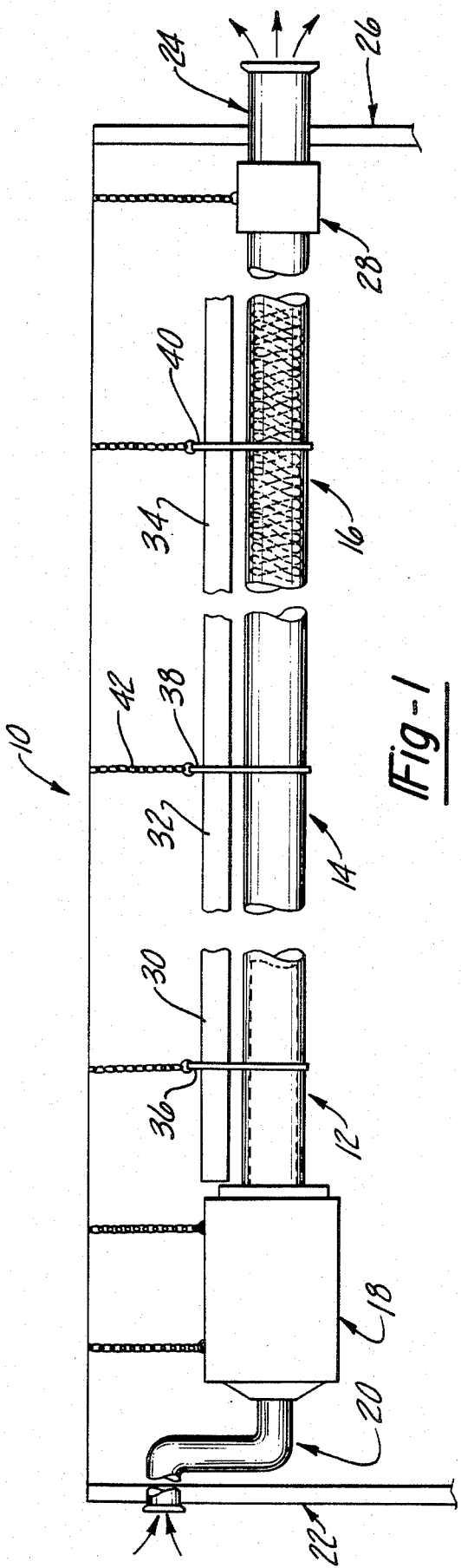
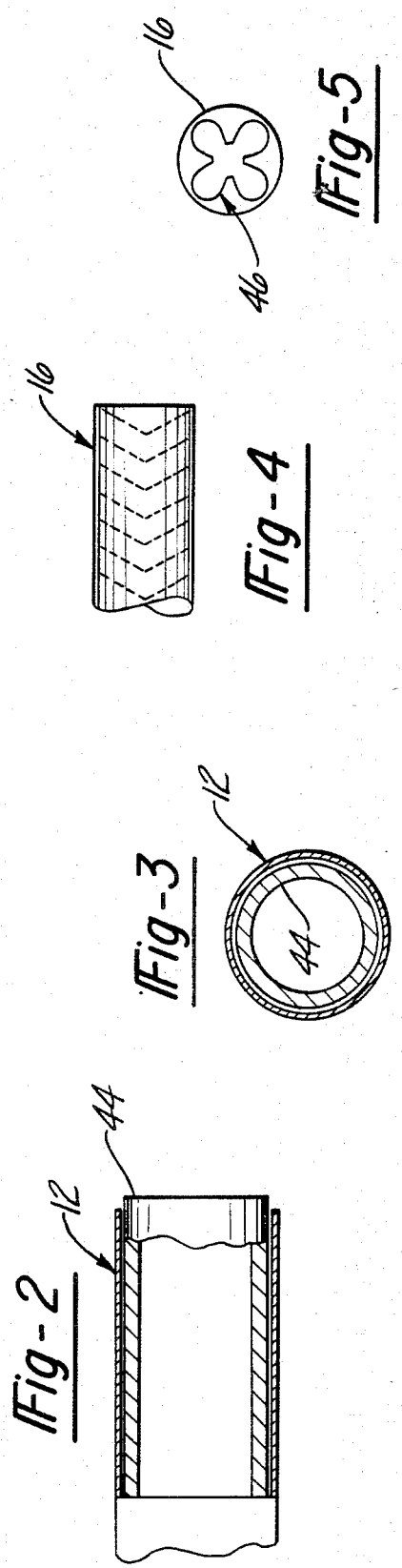

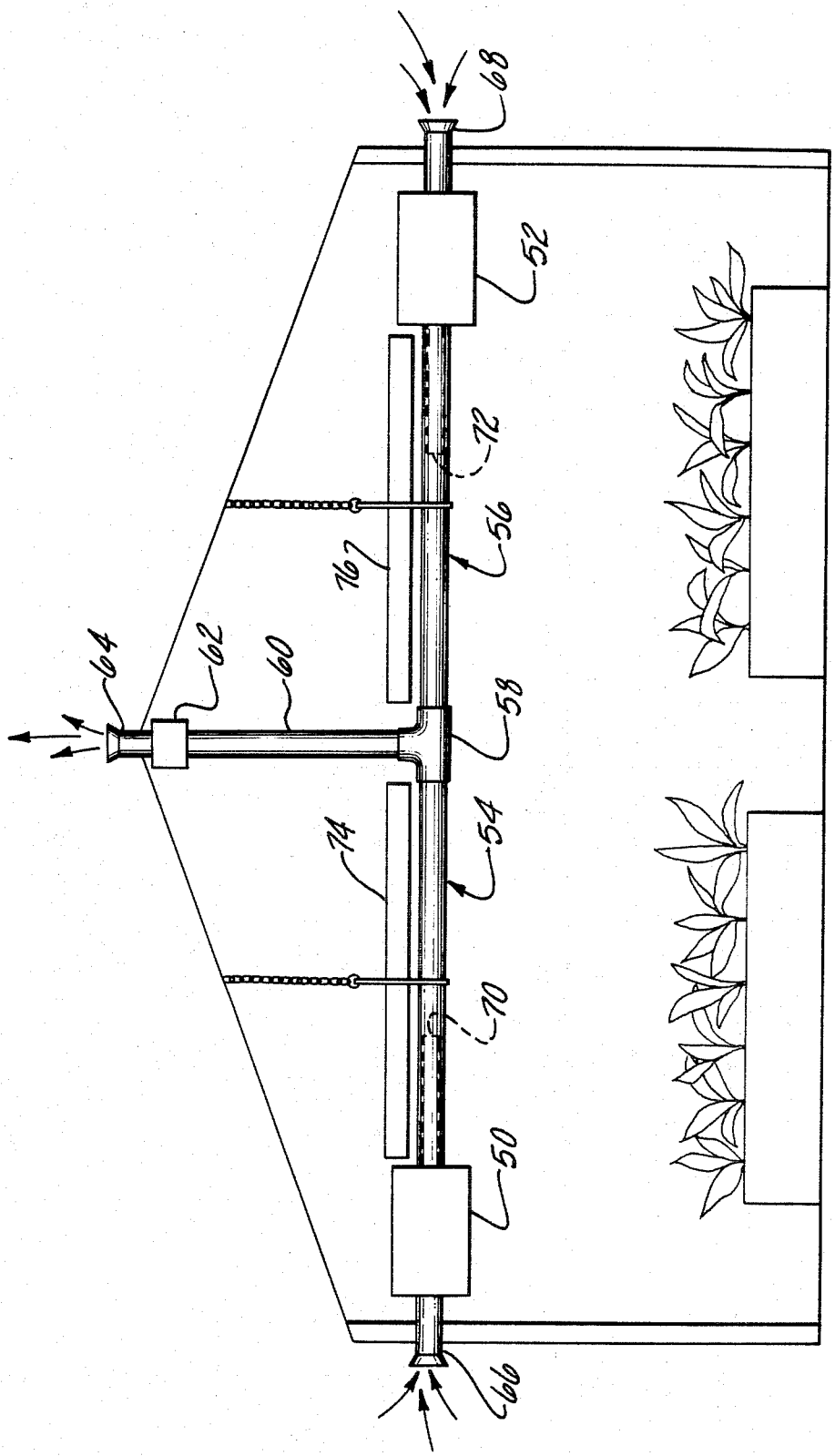

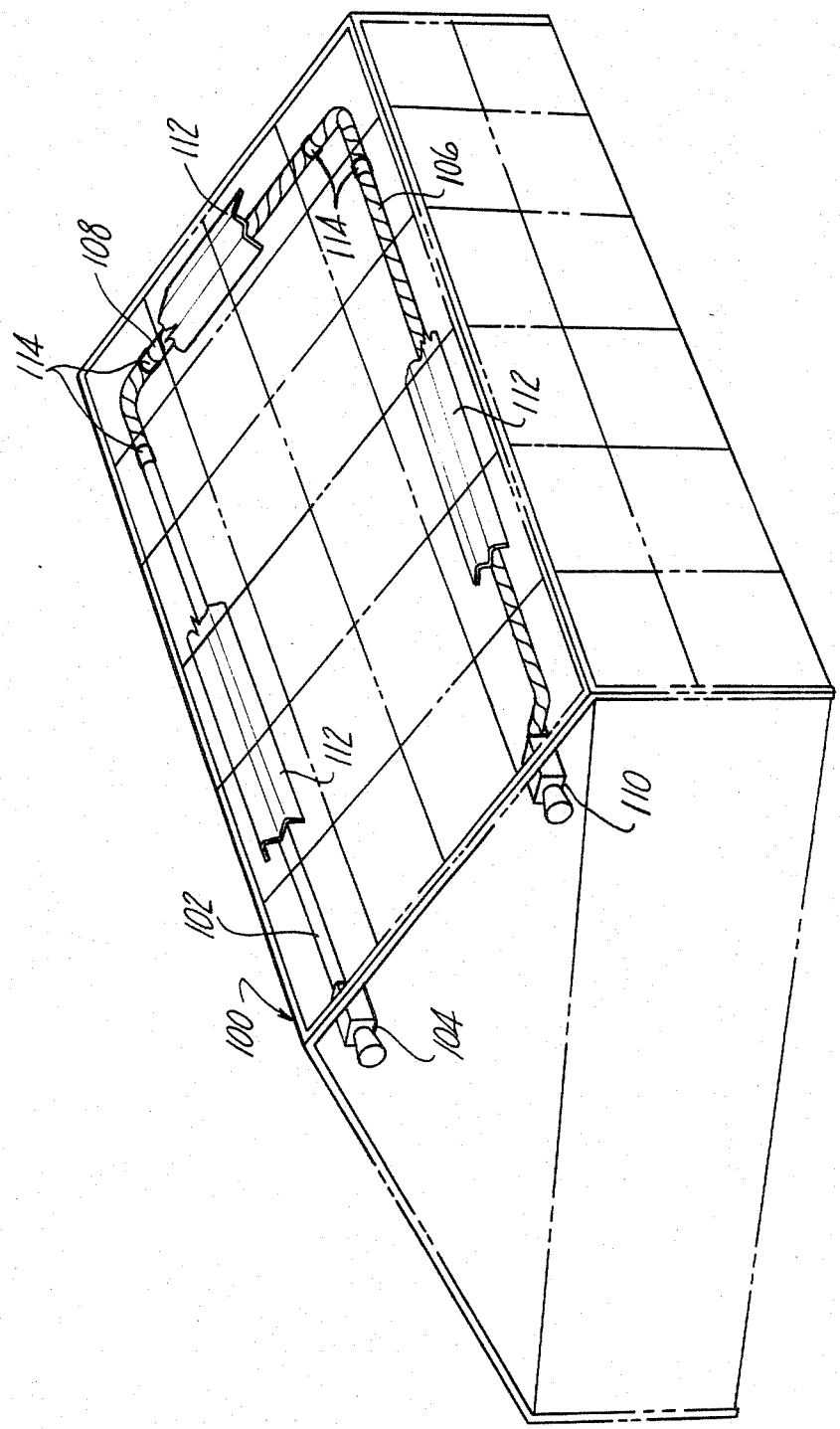

RADIANT HEATER SYSTEM

DESCRIPTION

1. Technical Field

This invention relates generally to a low intensity radiant heater systems of the type employing a burner fired into a long emitter tube or conduit and, more particularly, to means for increasing the thermal efficiency of the system by balancing the effective temperature output of the energy emitting conduit over its working length and, in some cases, by employing a heat exchanger to transmit thermal energy from the conduit to preheat any outside air which is introduced to the system.

2. Background Art

Radiant energy heating systems employing energy emitting tubular conduits mounted overhead in an are to be heated are well known. Such systems generally comprise a burner which fires into a tubular emitter conduit, a reflector mounted over the conduit, and an exhaust. One such radiant heater system is disclosed in U.S. Pat. No. 3,399,833 to Johnson.

A characteristic of such systems is the wide variance in the amount of thermal energy emitted from the conduit over its working length. While the temperature inside the conduit immediately adjacent the burner may reach levels in excess of 1600 degrees F., the temperature inside the conduit at the exhaust end, depending on length, may be as low as 200 degrees F. This results in an uneven emission of thermal energy throughout the length of the conduit and, unless the tube spacing is varied, correspondingly uneven temperatures in the area being heated by the system.

Exhaust end temperatures may be raised by using a larger burner or shortening the length of the emitter conduit, or both. But this requires that the section of conduit immediately adjacent the burner be constructed to withstand higher temperatures. It may also result in lower operating efficiencies due to the discharge of usable energy at the exhaust end. In addition, raising the temperature at the burner end also increases the required distances between system components and nearby structural materials of a combustible nature. Finally, this approach does not solve the problem of uneven heating.

One attempt to more evenly distribute the thermal energy radiated by the conduit is disclosed in U.S. Pat. No. 4,319,125 issued to Prince. Prince employs a dispersing reflector adjacent to the relatively hot portion of the conduit and a parabolic or concentrating reflector adjacent to a colder portion of the conduit to compensate for the varying intensity of thermal energy radiated throughout the length of the conduit. However, while the use of various shaped reflectors may provide some measure of improvement in the evenness of distribution of the thermal energy throughout the area serviced by the heater system, the throughput capacity of the system is still limited by the materials capabilities of the conduit section immediately adjacent the burner as described above.

Another problem is the contamination of the air in a building where the by-products of a manufacturing process within the building may have trace elements of halogenated hydrocarbons such as florides and chlorides. Where air containing these by-products is recirculated through the heater system, these by-products may condense out of the heated effluent as hydrochloric or hydrofloric acid and may cause severe corrosion of the components of the heater system. This corrosion can be partially avoided by providing a closed heating system which utilizes only air from the exterior of the building. However, there is a loss of efficiency under this method because this air is often considerably lower in temperature than the air inside the building.

DISCLOSURE OF THE INVENTION

The principal objective of the invention is to provide a radiant energy heating system having a more even, balanced heat output over the length of the emitter tube than was the case heretofore. In accordance with the present invention, a radiant energy heating system employs an energy emitting tubular conduit extending at least partly through the area to be heated, a burner connected to one end of the conduit to inject thermal energy into the conduit, and means for directly altering the thermal output of portions of the conduit in order to balance the thermal emission over the length of the tubular conduit.

In a preferred embodiment, the thermal output of the high temperature portion of the tubular conduit, i.e., that portion immediately adjacent the burner, is reduced by the insertion of a hollow sleeve of insulative material positioned within and concentric with the conduit. As a result, the external temperature of the tube or conduit in the vicinity of the burner is lowered and heat energy is transfered further down the tube or conduit to provide a maximum span of uniform heat over the length of the system. In addition, the same low cost tubing with the insulative sleeve can accommodate an effluent of much higher temperature. Thus, the BTU throughput of the burner and the entire system can be increased without the use of expensive materials for the tubular conduit.

According to another aspect of the invention, the thermal output of the lower temperature end of the tubular conduit is effectively raised. This may be accomplished by placing a turbulator within that portion of the conduit, by painting the tube black, by adding fins or by employing combinations of these means. The turbulator serves to retain the thermal energy in the relatively cool effluent flowing through the remote end of the system. The temperature in the area surrounding the lower temperature end of the tubular conduit is therefore increased, and a more consistent temperature range throughout the extent of the structure is produced.

According to another aspect of the invention, a two-way heat exchanger is connected to and communicates with the tubular conduit. A preselected mixture of internal and external air is routed through the heat exchanger via an inlet tube connected to the input end of the heat exchanger. An outlet tube and power exhaust means for drawing the air through the heat exchanger are connected to and communicate with the opposite end of the heat exchanger to force the preselected mixture of air through the heat exchanger and deposit the preheated air back into the internal environment. This infusion of pre-heated external air into the structure provides ventilation without loss of heating efficiency and positively pressurizes the building, thereby inhibiting the flow of unheated external air from other sources into the building. In addition, the use of external air during periods when manufacturing is in operation within the building insures that the corrosive by-products of the manufacturing processess are not recirculated through the radiant heater system components. When ventilation is unnecessary, such as at night, the mixture of air entering the heat exchanger may be altered so that only internal air is recirculated through the system.

Thus, a radiant energy heating system is provided which employs means for altering the thermal output per unit length in portions of the energy emitting tubular conduit thereby tending to balance the thermal emission over the length of the conduit. The invention further allows for the use of a burner unit of significantly greater output of BTU's per hour with the same low cost tubular conduit. Consequently, this increased throughput and more even distribution of thermal energy throughout the length of the system results in a radiant heater system which can more economically service larger areas.

Also, the ability to maintain the energy emitting tubular conduit at relatively uniform temperatures of 300 degrees F.–600 degree F. throughout its length insures that a high percentage of the emitted heat energy will be absorbed by the building floor, fixtures and occupants rather than reflected off to the ceiling. The energy emitted in this temperature range characteristically has a wavelength ranging from 3.78 to 6.8 microns. It has been shown that, over a substantial portion of this range (2.8–6.2 microns) greater than 90% of the thermal energy will be absorbed by the concrete floor and fixtures in the building. Likewise, radiation striking human occupants has an absorption rate as high as 90% over this range. These wavelength absorption characteristics are well known to those skilled in the art and are reported in Schtrank, *Engineering Principles*, Section VI, pp. 6–25.

Other advantages flow from the invention. For one, significant reduction in the temperature of the emitter tube near the burner decreases the required distances between the tube and adjacent combustible materials such as ceiling structures, and also allows the emitter tube to be suspended at lower overhead clearances, thus improving space utilization factors.

A particular application of the invention which well illustrates these advantages is the use of a radiant heater system in greenhouses. The normally low profile of greenhouses dictates a relatively small clearance between the conduit and the plants growing in the greenhouse. Because of this small clearance, often as low as three to six feet, it is important that the temperature of the conduit immediately adjacent the burner units be reduced in order to prevent the foliage from burning or dehydrating.

In this context, a hollow insulative sleeve which varies in its thickness from one half inch along the top of the tubular conduit to one inch at the bottom of the tube may be utilized to further reduce the amount of direct radiation emitted downward from the tubular conduit onto the plants directly below. In addition, other means may be utilized to alter the emissivity of the upper portion of the tubular conduit at the hot end of the system. For example, where the direct emission is greatly reduced through the use of a insulative sleeve of varying thickness, the upper portion of the tubular conduit may be painted black or a concentrating reflector may be used to direct more of the radiation emitted from the upper half of the tubular conduit in the downward direction. Thus, a plant at the hot end of the tubular conduit may be adequately heated by indirect radiation while the amount of direct radiation is greatly reduced in order to allow for limited clearances between the plants and the tubular conduit. In addition, controlling the thermal output of various sections of the tubular conduit in this way allows for a balanced heating of the plants throughout the greenhouse and, therefore, a uniform growth rate.

BRIEF DESCRIPTION OF THE DRAWINGS

FIG. 1 is a side elevational view of a typical installation in a building of one embodiment of the present invention;

FIG. 2 is a partial cross-sectional view of a section of tubular conduit containing an insulative sleeve;

FIG. 3 is an end view of a section of conduit containing an insulative sleeve;

FIG. 4 is a partial cross-sectional view of a section of conduit containing a turbulator;

FIG. 5 is an end view of a section of conduit containing a turbulator;

FIG. 6 is a side elevational view of a two burner heating system installed in a greenhouse.

FIG. 10 is a perspective view of another greenhouse heating system.

BEST MODE FOR CARRYING OUT THE INVENTION

Figure 7:
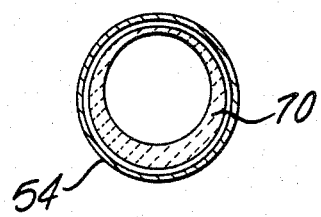
FIG. 7 is an end view of a section of conduit containing an insulating sleeve of varying thickness.

Referring to the drawings, FIG. 1 illustrates one embodiment of the present invention, a single burner low intensity radiant heating system 10. The system is generally composed of a number of serially-connected energy emitting tubular conduits 12, 14 and 16 which extend across a substantial portion of the area to be heated. The tubular conduit 12 is connected at one end to the output end of a burner unit 18. The air intake end of the burner unit 18 may be connected to an intake tube 20 which extends to the wall of the building in order to provide outside air for the system. It should be noted that it is not necessary to use external air as the supply for the burner unit 18. However, the relatively cleaner outside air is often supplied to the intake end of the burner unit 18, particularly in industrial applications where the air inside the building may contain pollutants which can adversely affect the system. The opposite end of the tubular conduit is connected to an exhaust tube 24 which vents the products of combustion contained in the effluent into the external environment. An exhaust fan 28 is preferably connected to the exhaust end of the system in order to provide a constant suction force which encourages the travel of the flame from the burner unit 18 as well as the heated air and products of combustion through the tubular conduit sections 12, 14 and 16. An advantage of maintaining a constant suction force on the heating system is that such a force will tend to draw air from outside the tubular conduit through any leaks in the conduit into the system rather than forcing the products of combustion through these leaks into the environment in the building. A series of reflectors 30–34 are provided which serve to direct the radiant energy emitted from the tubular conduit sections towards selected areas on the floor of the building. The reflectors 30-34 and the tubular conduit sections 12-16 are held in position by a series of support brackets 36-40. These brackets 36-40 as well as the other components of the radiant heating system are suspended from the ceiling by a series of steel chains or cables 42.

The section of tubular conduit 12 nearest the burner unit 18 contains a hollow sleeve of insulative material which tends to decrease the transmission of heat energy in the tubular conduit in this area and thus lower the temperature of this section of tubular conduit. This insert may be made of any insulating material such as magnesium oxide, aluminum oxide, or other ceramic material. It may be cast from a solid material, agglomerated on a form and fired, or laminated from sheets. In the preferred embodiment, a ceramic refractory material, manufactured by the Carburundum Corporation under the trademark Fiberfrax is utilized. The Fiberfrax is maintained as a slurry and is formed about a mandrel into its desired tubular shape. The mandrel is then removed and a number of pieces of the resulting insulative tubing are joined at their ends to form a desired length. It should be noted that where insulation is desired over a specific length of tubular conduit in a system, the insulative sleeve must be continuous over that length. Otherwise, the tubular conduit is likely to burn out in any areas which are left unprotected due to gaps in the insulative sleeve.

As best shown in FIGS. 2 and 3, the outer diameter of the insulative sleeve 44 is only slightly smaller than the inner diameter of the tubular conduit 12 so as to provide a relatively snug fit. It should be noted that the insulative sleeve 44 is not connected to the tubular conduit 12 due to the fact that the insulative sleeve 44 and the tubular conduit 12 have different expansion rates. When exposed to high temperatures, the tubular conduit 12 will experience greater expansion than the insulative sleeve 44. Thus, it is desirable that the insulative sleeve initially fit tightly into the tubular conduit 12. Prior to installation, the insulative material is slidably positioned within those sections of tubular conduit in which a relatively lower temperature is desired. In the embodiments shown in FIGS. 1 and 6, insulative sleeves 44, 70 and 72 are placed in sections of tubular conduit 12, 54 and 56 nearest the burner units 18, 50 and 52. The length and thickness of the sleeves may be varied depending upon the size of the burner unit and the desired temperature range. However, a general objective is to balance output so parameters are chosen such that the temperature of the conduit 12 adjacent the burner 18 is the same as the temperature of the uninsulated conduit section 14. As an example, in a system using three inch diameter conduit and a 150,000 BTU burner, the effluent within the conduit typically reaches temperatures in excess of 1800 degrees F. The temperatures of the surface of the conduit may vary from 980 degrees F. at end nearest the burner to 150 degrees F. at the exhaust end of the conduit. Installing an insulative sleeve having a thickness of ½ inch and a length of 20 feet, produces a nearly uniform temperature of 600 degrees F. over 40 feet of conduit.

The temperature reduction in the areas of the tubular conduit which contain the insulative sleeve allows for reduced clearance distances between the conduit and combustible materials in the building. In addition, the insulative sleeve protects the tubular conduit itself from burning out in areas where the conduit would normally be exposed to extremely high temperatures, such as that section nearest the output end of the burner unit. Thus, the use of the insulative sleeve obviates the need for using expensive alloy materials for tubular conduit sections immediately adjacent the burner unit and allows for the use of burner units of significantly greater output with a more even distribution of the thermal energy throughout the length of the system.

Referring to FIGS. 4 and 5, a turbulator 46 is disposed in the section of tubular conduit 16 nearest to the exhaust end of the system. The turbulator 46 serves to increase the amount of heat energy emitted from this otherwise cooler section of tubular conduit 16. The turbulator is slidably positioned within the tubular conduit 16 during installation of the system. Thus, by using the turbulator 46 at the cool end of the system, and the insulative ceramic sleeve 44 at the hotter end of the system, a more even, balanced heat output over the length of the tubular conduit is achieved. It should be noted that the turbulator 46 is even more effective when used in the system shown in FIG. 1 because the insulative ceramic sleeve 44 permits the use of a burner unit which is capable of producing higher front end temperatures. Under these conditions, the temperature of the effluent in the tubular conduit 16 at the exhaust end of the system is also higher. Thus, there is less likelihood that the products of combustion will be cooled to the extent that they will collect on the inside of the tube as a condensate before being disposed of through the exhaust outlet tube 24.

As will be appreciated by those skilled in the art, the system of the present invention may be designed such that the temperatures at the exhaust end of the tubular conduit are sufficiently low so that the products of combustion condense out the effluent in order to release the latent heat energy at the cool end of the tubular conduit. This latent energy can account for as much as 8% of the heat of combustion of the effluent. However, this increased efficiency is offset by the increased costs of materials which must be utilized in order to collect and drain the condensate at the exhaust end of the system. Since the condensate is highly corrosive, the portion of conduit and any draining tubes employed to receive the condensate must be constructed of a corrosive resistant alloy such as stainless steel. The condensate should then be directed to a receptacle which contains a neutralizing compound such as lime in order to prepare the material for safe disposal.

FIG. 6 illustrates an embodiment of the present invention installed for use in a greenhouse. This embodiment employs two burner units 50 and 52 mounted at opposite ends of the area to be heated. A first section of tubular conduit 54 is connected to the output end of the first burner unit 50, a second section of conduit 56 is connected to the output end of the second burner unit 52. Each of the first and second sections of tubular conduit 54 and 56 are interconnected by means of a "Y" connector pipe 58. An exhaust tube 60 is connected to the third opening in the "Y" connector and runs in a vertical direction to the roof of the greenhouse. In this particular embodiment the exhaust tube is connected to an exhaust fan 62 which maintains a suction force throughout the entire system causing the heated effluent to travel simultaneously from both burner units 50 and 52 towards the center of the greenhouse through the Y connector 58 and up the exhaust tube 60. At this point the effluent is expelled through an outlet tube 64 to the external environment. Each of the burner units 50 and 52 are connected at their input end to inlet tubes 66 and 68 which protrude through the outer walls of the greenhouse to provide fresh air for the system. An insulative sleeve 70 is inserted into that portion of the tubular conduit 54 nearest the output end of the burner unit 50. A similar insulative sleeve 72 is placed in that portion of the tubular conduit 56 nearest the output end of the second burner 52.

It is to be understood that FIG. 6 is not to scale and that the proportions, particularly length, are not strictly realistic. Normally, the diameter of the tubular conduit 54, 56 is on the order of 4½″ and the length from burner 50 to T-Section 58, for example, is about 100′. Over this length, an external temperature differential of only a few degrees has been achieved. It is particularly noteworthy that this is achieved with a single relatively large burner 50 whereas other systems require multiple, relatively small burners fired through each other in series to achieve the same degree of uniformity. Applicant's invention, thus, enjoys a great cost advantage.

It is also to be understood that the arrangement of FIG. 6 is illustrative only and that various other arrangements are equally usable or even superior in given circumstances. For example, FIG. 10 shows how a greenhouse 100 of longitudinally peaked roof configuration may be advantageously heated by running a first length 102 of tubular conduit from a relatively large burner 104 longitudinally along the interior of the peak, then running a second length 106 longitudinally along the eave or intersection between the roof and sidewall of the greenhouse, the two lengths 102 and 106 being joined by a length which runs down the roofline at the opposite end of the greenhouse or, in the case of a longer structure, at some intermediate location. Length 106 is connected to exhaust fan 110 and reflector 112 extends over the conduit over its entire length.

The length 102 is preferably solid steel conduit lined with a ceramic insulator as described with reference to FIGS. 1, 2, 3 and 6. The length of liner extends preferably 20′ or so from the burner 104. The balance of the conduit may be made from less expensive spiral wrapped steel which is aluminized prior to wrapping. In this arrangement, the hotter length 102, althrough dramatically reduced in temperature relative to unlined pipe, is higher and the cooler length 106 is lower so that uniform plant heating is achieved.

It will be appreciated that the liner 70 (or 44) has the effect of sending thermal energy downstream in the conduit, cooling the end or length nearest the burner and warming the end or length farthest from the burner and nearest the exhaust. This spreading or transfer of heat output allows the entire system to be operated in the 2.8 to 6.2 micron wavelength range where concrete floors and human occupants enjoy the greatest radiant absorption, thus relieving still further the common feeling with linear radiant systems that one end is hot and the other cool.

FIG. 10 illustrates a further variation of the invention in the use of connectors 114 between runs of conduit. These connectors contain short turbulator sections to slow down the axial air flow and extract heat from the effluent at several places along the effective heating length of the conduit.

According to a variation shown in FIG. 7, the insulative sleeve 70 may vary in thickness from ½ inch at the top of the tube to one inch at the bottom of the tube. Though not shown in FIG. 7, the insulative sleeve 72 in the tubular conduit 56 nearest the second burner 56 may similarly vary in thickness about its circumference. The increased thickness along the bottom of the tube in the hottest areas of the system greatly reduces the radiation emitted from the bottom of the tubular conduit towards the plants below. The relatively greater energy emitted from the upper portion of the tube may be redirected by the reflectors 74, 76 down to the plants below. It will be appreciated by those skilled in the art that this indirect radiation, though the same cumulative intensity per foot of length as that emitted from the bottom of the tube, is travelling a greater distance to get to the objects located below the tubular conduit and is more broadly dispersed due to reflection. The upper half of the tubular conduit 54 may also be painted black in order to further increase its thermal output, thereby further increasing the indirect thermal energy received by the objects below this section of conduit. Thus, the direct thermal energy is greatly reduced without an inordinate reduction in the total amount of energy emitted in the area immediately adjacent the output end of the burners 50 and 52. This allows for an even smaller clearance distance between the taller plants and the hot sections of the tubular conduit.

To allow for easy installation, a stripe (not shown) or similar indicia may be painted on the outside of the tubular conduit along its length to indicate where the thickest portion of the inner sleeve is located. Proper alignment of the thicker wall portions of the insulative sleeve relative to the objects directly below can be assured by orienting the painted stripe on the outside of the conduit at the bottom.

Figure 8:
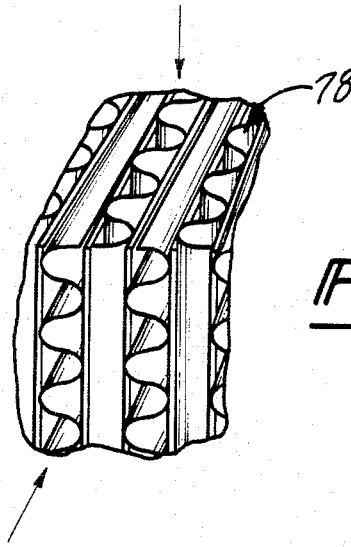
FIG. 8 is corner perspective view of an air-to-air two-way heat exchanger.
Figure 9:
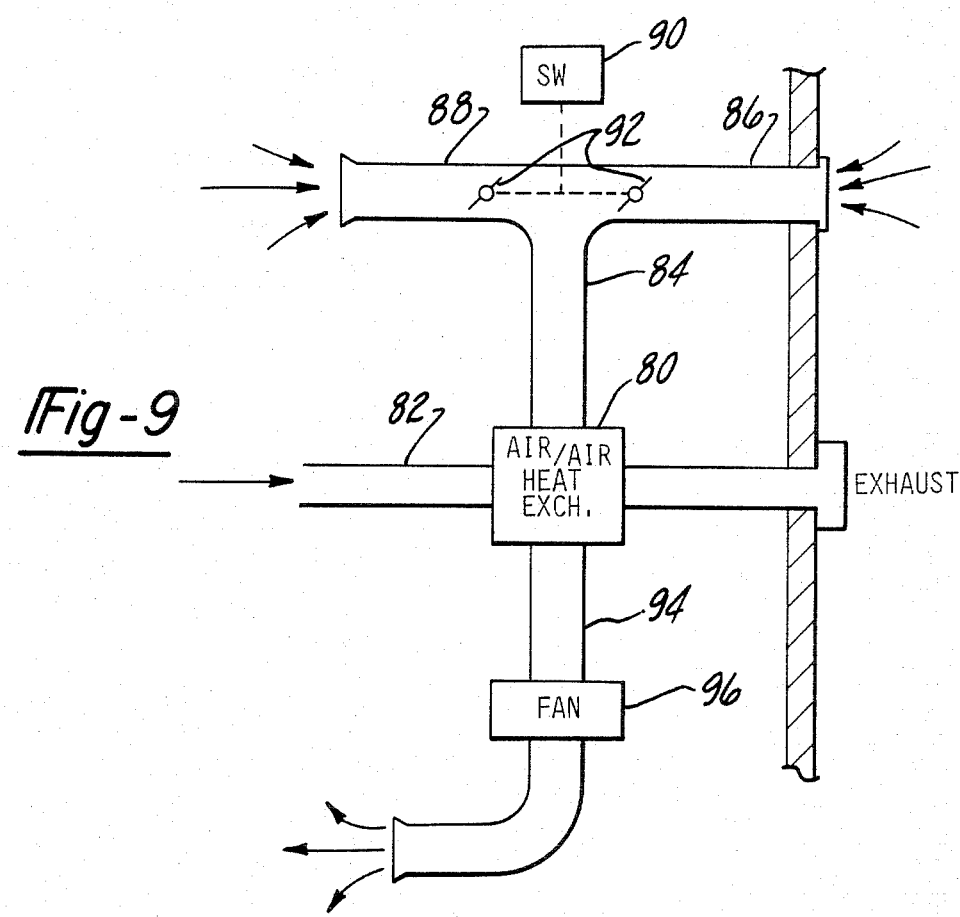
FIG. 9 is a side elevational view of an embodiment of the present invention which includes a heat exchanger for preheating vented air.

FIG. 9 illustrates a preferred embodiment of the present invention which includes a two-way air-to-air heat exchanger 80 which is mounted and communicates with the tubular conduit 82. The heat exchanger is preferably a standard model which employs a series of corrugated plastic layers mounted to alternately allow isolated air flow in 2 directions (see FIG. 8). The heat exchanger 80 is also connected to and communicating with an inlet tube 84. The inlet tube 84 has two openings at its first end, the first opening 86 is mounted on an external wall of the building to receive air from outside of the building, the second opening 88 is positioned to receive air from within the building. The second end of the inlet tube 84 is connected to and communicates with the heat exchanger 80 and supplies the heat exchanger with a preselected mixture of air drawn from each of the two openings 86 and 88 at the first end of the inlet tube. A switch 90 is preferably provided which controls dampers 92 mounted within the inlet tube 84 allowing the operator to preselect whatever mixture of external and internal air is desired. An outlet tube 94 is connected to the heat exchanger 80 to receive the air mixture supplied by the inlet tube 84. Power exhaust means, preferably a fan 96, is mounted on the outlet tube to provide the suction force necessary to draw the air mixture through the inlet tube 84 and through the heat exchanger 80, and then exhaust this preheated air mixture into the heated environment. The heated effluent characteristically enters the heat exchanger from the tubular conduit 82 at temperatures of approximately 300 degrees F. and leaves the heat exchanger 80 at temperatures of approximately 200 degrees F. This recovered thermal energy is then absorbed by the air mixture which is passed through the second pathway of the heat exchanger then deposited back in the internal environment. Thus, thermal energy which would have been discharged from the radiant heater system is utilized to preheat external air allowing for energy efficient ventilation of the building. In operation, the exhaust fan 96 will typically draw 55 cu. feet of fresh/recirculated air through the heat exchanger per minute. This ingestion of preheated and recirculated air into the system also serves to increase the internal air pressure of the building, thus reducing the unwanted entry of unheated external air.

Although FIG. 9 shows the heat exchanger 80 as being located nearest the exhaust end of the system, the heat exhanger 80 may be located anywhere along the length of the tubular conduit 82 without departing from the spirit of the invention. In particular, where the temperature of the heated effluent is low enough that condensation is occuring at the exhaust end of the system, the heat exchanger 80 may be located nearer the burner unit in order to reduce the likelihood that corrosive condensate is passed through the heat exchanger 80.

It will be appreciated from the foregoing that a radiant heating system is disclosed with means provided for altering the thermal output over selected portions of the tubular conduit resulting in a balanced thermal emission and, thus, a more uniform temperature throughout the length of the system. The use of insulative means, particularly a hollow sleeve which may be of varying wall thickness, is disclosed and allows for use of this type of system in applications requiring relatively low clearance distances between the tubular conduit and the various combustible materials located in the area to be heated.

The thermal efficiency of the heating system of the present invention is further increased through the use of a two-way heat exchanger mounted at the exhaust end of the tubular conduit to transfer thermal energy from the existing effluent to a mixture of fresh external and recirculated internal air.

I claim:

1. In a radiant energy heating system of the type having an energy-emitting tubular conduit extending at least partly through the area to be heated, a burner connected to one end of the tubular conduit to inject thermal energy into the conduit, the other end of the conduit serving to exhaust the products of combustion from the burner wherein the improvement comprises:
means associated with a portion of said conduit for altering the thermal output per unit length of said portion including a hollow sleeve of insulative material positioned within and concentric with the conduit, said alteration being in a sense tending to match the output per unit length of at least another portion of said conduit thereby to balance the thermal emission over the length of said conduit.

2. The system defined in claim 1 wherein the insulative material is positioned in the section of tubular conduit located immediately adjacent the burner.

3. In a radiant energy heating system of the type having an energy emitting tubular conduit extending at least partly through the area to be heated, a burner connected to one end of the tubular conduit to inject thermal energy into the conduit, the other end of the conduit serving to exhaust the products of combustion from the burner wherein the improvement comprises:
means associated with a portion of said conduit for altering the thermal output per unit length of said portion in a sense tending to match the output per unit length of at least another portion of said conduit thereby to balance the thermal emission over the length of said conduit, said means including a hollow sleeve of insulative material positioned within and concentric with the conduit wherein the thickness of the hollow sleeve of insulative material varies about the circumference of the sleeve in order that the surface of the tube immediately adjacent the thicker portion of the insulative sleeve emits a relatively lower amount of thermal energy.

4. The system defined in claim 2 wherein the insulative sleeve in of sufficient length that the temperature of the tubular conduit in the section containing the insulative sleeve is substantially equal to the temperature of the next adjacent downstream section of tubular conduit without the insulative sleeve.

5. The system defined in claim 1 wherein the means for altering the thermal output per unit length of the tubular conduit includes a turbulator disposed within the conduit.

6. The system defined in claim 5 wherein the turbulator is positioned in the section of tubular conduit located immediately adjacent the exhaust end of the conduit.

7. The system defined in claim 5 wherein the turbulator is of sufficient length that the temperature of the tubular conduit in the section containing the turbulator is equal to the temperature of the adjacent section of tubular conduit without the turbulator.

8. The system defined in claim 1 wherein the means for altering the thermal output per unit length of the tubular conduit includes a black surface coating on the conduit.

9. In a low-intensity radiant energy heating system of the type comprising a burner, a radiating conduit of effective heating length connected to receive products of combustion from the burner and having an exhaust remote from the burner,
a circumferentially non-uniform sleeve of insulating material within the conduit adjacent the burner and extending only through a part of the burner's effective heating length for transferring thermal energy from the conduit length nearest the burner toward the length nearest the exhaust to tend to equalize the thermal output of the conduit over its effective heating length.

10. Apparatus as defined in claim 9 wherein the wavelength of radiated energy from a majority of the effective length is in the range of 2.8 to 6.2 microns.

* * * * *